United States Patent [19]

Koch et al.

[11] 4,300,917

[45] Nov. 17, 1981

[54] METHOD FOR PREVENTING ADHESION OR CAKING OF HYDROCARBON-CONTAINING RAW MATERIALS

[75] Inventors: Christian Koch; Alfred Behrmann, both of Erlangen, Fed. Rep. of Germany

[73] Assignee: Kraftwerk Union Aktiengesellschaft, Mülheim, Fed. Rep. of Germany

[21] Appl. No.: 147,154

[22] Filed: May 6, 1980

Related U.S. Application Data

[62] Division of Ser. No. 18,410, Mar. 7, 1979, Pat. No. 4,233,036.

[30] Foreign Application Priority Data

Mar. 30, 1978 [DE] Fed. Rep. of Germany ....... 2813765

[51] Int. Cl.$^3$ .............................................. C10G 45/00
[52] U.S. Cl. .................... 48/213; 208/48 R; 585/950
[58] Field of Search ...................... 48/213, 197 R, 202, 48/207, 210, 213; 208/48 R; 585/950; 201/9, 34, 36, 38

[56] References Cited

U.S. PATENT DOCUMENTS

| | | | |
|---|---|---|---|
| 1,983,027 | 12/1934 | Henry | 208/48 R |
| 3,363,024 | 1/1968 | Majumdor et al. | 48/213 |
| 3,484,219 | 12/1969 | Dent et al. | 48/213 |
| 3,591,356 | 7/1971 | Thompson et al. | 48/213 |
| 3,857,685 | 12/1974 | Lehman | 48/213 |
| 3,870,481 | 3/1975 | Hegarty | 48/213 |
| 3,942,958 | 3/1976 | Thompson et al. | 48/213 |
| 4,047,972 | 9/1977 | Steinbar | 208/48 R |
| 4,127,393 | 11/1978 | Timmins et al. | 48/213 |

Primary Examiner—Peter F. Kratz
Attorney, Agent, or Firm—Herbert L. Lerner

[57] ABSTRACT

Disclosed is a method for preventing adhesion or caking of raw materials such as oil as it is subjected to hydrogenation gasification while being heated to above 700° K. as it passes downwardly through a reaction vessel. The particles of raw materials as they pass through the vessel in a temperature zone of about 600° to 700° K. directly contact a medium at a temperature above 1000° K. to rapidly heat the surfaces of the particles to above 700° K. by direct contact with the hot medium alone, in the absence of combustion reaction, to cause the particles to become non-caking in its further downward passage through the reaction vessel.

2 Claims, 2 Drawing Figures

METHOD FOR PREVENTING ADHESION OR CAKING OF HYDROCARBON-CONTAINING RAW MATERIALS

This is a division of application Ser. No. 018,410, filed Mar. 7, 1979 now U.S. Pat. No. 4,233,036.

BACKGROUND OF THE INVENTION

1. Field of the Invention

This invention relates to hydrogenating gasification of hydrocarbon-containing raw materials such as oil or coal in a reaction vessel through which the raw material passes while being heated increasingly to above 700° K. and more particularly refers to a new and improved method and apparatus for preventing adhesion or caking during hydrogenating gasification in the reaction vessel.

2. Background of the Invention

Such apparatus for hydrogenating gasification, for instance, is described in German Published Prosecuted Application Number 2 609 320. There, the coal is heated with hot hydrogen for coal gasification counter-flow-wise in a reaction vessel to above 700° K. and is partly gasified in the process. The raw material particles in the reaction vessel have a tendency to adhere or cake. To reduce this tendency, oxygen may be added to effect partial combustion of the raw material. This destroys raw materials and also introduces extraneous combustion products in the reaction products. A fluidized bed has been suggested to minimize adhesion or caking of the particles, but this involves more complicated and costly apparatus and operation.

SUMMARY OF THE INVENTION

It is an object of the present invention to provide method and apparatus for preventing adhesion or caking of coal or oil in such a reaction vessel in hydrogen gasification without partial combustion of the raw material used taking place through the addition of oxygen. In this manner, adhesion or caking of the raw material particles can be prevented without using a fluidized bed.

With the foregoing and other objects in view, there is provided in accordance with the invention an apparatus for preventing adhesion or caking of normally liquid and solid hydrocarbon-containing raw materials such as oil or coal in the hydrogenation gasification in a reaction vessel, through which the raw material passes while being heated to a temperature above 700° K., which comprises an enclosed vertical vessel, feed-in means for introducing raw materials in particle form into the top of the reaction vessel wherein it passes down through the reaction vessel, an inlet in the reaction vessel for the introduction of a hydrogencontaining gas at a temperature above 700° K. in admixture with the raw materials to heat the raw materials to a temperature above 700° K. and to effect hydrogenation gasification of part of the raw materials, heating means disposed in the reaction vessel in the path of the downwardly passing particles of raw materials in a temperature zone wherein the downwardly passing particles are at a temperature of about 600° to 700° K., and means for intermittently heating the surface of the heating means in the reaction vessel to a temperature above 1000° K. to rapidly heat the surfaces of the raw material particles to above 700° K. by direct contact with the heating means alone, in the absence of combustion of raw materials with added oxygen, to cause the raw material particles to become non-caking in its downward passage through the reaction vessel at a temperature above 700° K.

In accordance with the invention, there is provided a method of preventing adhesion or caking of normally liquid and solid hydrocarbon-containing raw materials such as oil or coal in the hydrogenation gasification in a reaction vessel through which the raw material passes while being heated to a temperature above 700° K., which comprises passing raw materials in particle form downwardly through the reaction vessel, introducing a hydrogencontaining gas at a temperature above 700° K. in admixture with the raw materials to heat the raw materials to a temperature above 700° K. and to effect hydrogenation gasification of part of the raw materials, contacting the particles of raw materials as they pass downwardly through the reaction vessel in a temperature zone of about 600° to 700° K. with a medium which is intermittantly at a temperature above 1000° K. in contact with the particles to rapidly heat the surfaces of the raw material particles to above 700° K. by direct contact with the hot medium alone, in the absence of combustion of raw materials with added oxygen, to cause the raw material particles to become non-caking in its downward passage through the reaction vessel at a temperature above 700° K.

Other features which are considered as characteristic for the invention are set forth in the appended claims.

Although the invention is illustrated and described herein as embodied in a device for preventing adhesion or caking of hydrocarbon-containing raw materials, it is nevertheless not intended to be limited to the details shown, since various modificications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

In accordance with the invention, there is provided an intermittently operated heating device in the temperature zone of about 600° K. to 700° K. in the reaction vessel. The heating device has heating means with a surface temperature above 1000° K., so that the surfaces of the raw material particles in the reaction vessel are heated up fast to above 700° K. by contact with the heating means alone without combustion reaction, i.e., without partial combustion of the raw material through the addition of oxygen.

The heating device can consist, for instance, of a heated tube heat exchanger or of steam injection nozzles for steam above 1000° K.

Pertinent embodiment examples will be explained with reference to FIGS. 1 and 2.

Figure 1:
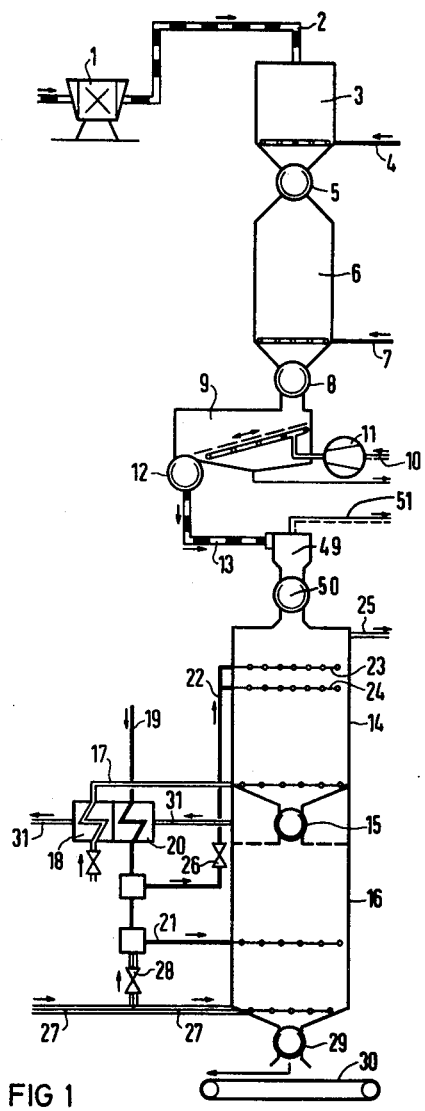
FIG. 1 diagrammatically illustrates a coal gasification plant in which hydrogen gasification is carried out in accordance with the invention.

In FIG. 1, a coal gasification plant is shown diagrammatically, such as is also described in the mentioned German Published Prosecuted Application No. 2 609 320. The coal is transported via a coal crusher 1 and a conveyor belt 2 into a pre-drier 3, in which it is heated with low-pressure steam entering through steam line 4. The thus pre-dried coal moves from pre-dryer 3 via a solid-material lock 5 into a pressure chamber 6, into which process steam at a pressure of about 60 bar is fed through steam line 7.

This process steam, like the low-pressure steam of the steam line 4, can be taken from a power plant with a pressurized-water reactor. The coal saturated with steam in the pressure chamber 6, is transferred through solid-material lock 8 into an expansion vessel 9 maintained at a lower pressure. The sudden pressure drop induced by the lower pressure in expansion chamber 9 causes fast removal of the steam contained in the coal whereby the coal particles are broken open and their surface is increased considerably.

The coal in the expansion vessel 9, is treated with carbon dioxide entering a carbon dioxide line 10 and forced into expansion vessel 9 by means of compressor 11. The coal from expansion chamber 9 moves through solid-material lock 12 and then, via a conveyor belt 13, into the reaction vessel 14 for the hydrogenating gasification of the volatile components. Although not essential, for smoother operation, a surge feed bin or hopper 49 and another solid-material lock 50 may be interposed between conveyor 13 and reaction vessel 14. Excess gas or vapor carried with the coal may be released through line 51.

The reaction vessel 14 for the hydrogenating gasification is separated from a reaction vessel 16 for steam gasification of the coal by a solid-material lock 15 through which the coal discharges from the reaction vessel 14 into the reaction vessel 16.

A hydrogen-containing hydrogenation gas flows through hydrogen line 17, is heated in a heat exchanger 18, and then enters the lower part of the reaction vessel 14. Process steam at a pressure of about 60 bar is fed from a steam line 19, through a heat exchanger 20 for further heating, and through a steam-oxygen line 21 into the reaction vessel 16. Also, the steam is fed through valve 26 and steam line 22 into two rows of nozzles 23 and 24 arranged on top of each other, and from there into the reaction vessel 14. The product gas obtained leaves the reaction vessel 14 through the gas line 25.

In accordance with the invention, the rows of nozzles 23 and 24 are arranged in a temperature zone of the reaction vessel 14, in which temperatures in the range of 600° to 700° K. occur in the hydrogenating solid-bed gasification. The steam from the steam line 19, superheated in the heat exchanger 20 can now be fed, controlled by means of valve 26, to the steam line 22 and to the rows of nozzles 23 and 24 into the reaction vessel 14. This feeding is always performed if the coal particles are in danger of sticking or caking. Thereby, the surface layer of the coal particles is heated for a short time to above 700° K. and the tendency to cake is thereby nullified.

The tendency to cake may be caused by the kind of change in raw materials or variation in feed rate or temperature as well as other operating conditions. The condition of the particles may be noted as for example by periodically withdrawing samples from the reaction vessel. Heating the surface of the coal particles for a short time, say five minutes or less, preferably less than one minute is generally adequate to prevent caking. The heating is stopped, and if necessary, after a period of time, say five minutes, repeated. Continuous heating is undesirable and indeed may be detrimental by promoting agglomeration of the particles.

The steam escaping from the rows of nozzles 23 an 24 together with the product gas, is drawn off through the gas line 25. In order to completely utilize the coal, oxygen is fed through an oxygen line 27 into the lower part of the reaction vessel 16. Part of the oxygen is branched off from the oxygen line 27 and through a valve 28 enters the steam and oxygen line 21. Ash remaining after the oxidation is discharged from the reaction vessel 16 through a solid-material lock 29 and is carried away on a conveyor belt 30. The gas mixture leaving the reaction vessel 16 through the gas line 31, containing steam, carbon oxides, hydrogen, and methane serves as the heating medium for the heat exchangers 18 and 20 and is processed in a manner known per se in the remaining parts, not shown, of the plant.

Figure 2:
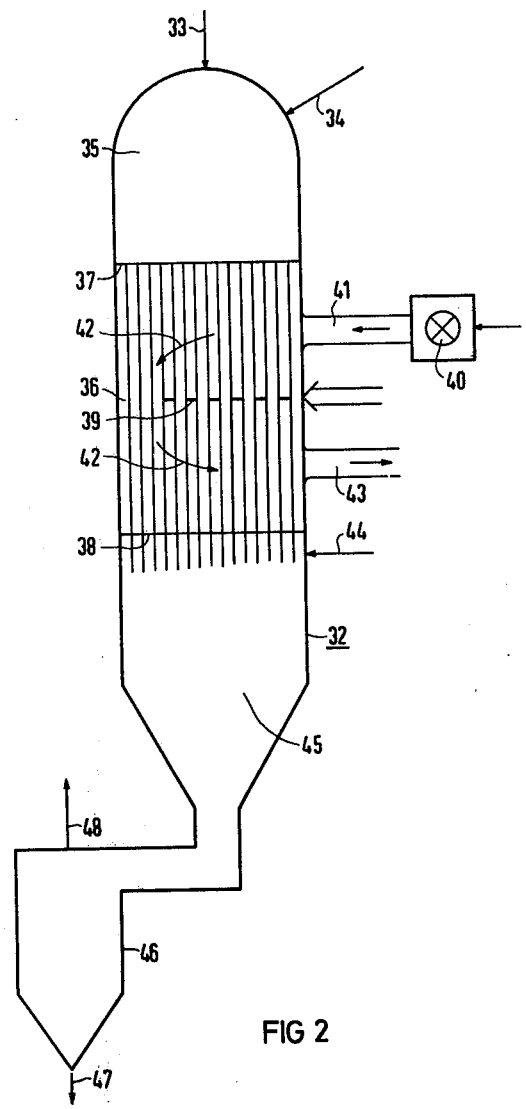
FIG. 2 diagrammatically illustrates hydrogen gasification of residue oil in a reaction vessel in accordance with the invention.

FIG. 2 shows diagrammatically a similar arrangement by the example of processing residue oil. In a reaction vessel 32, highly heated (700° K.) residue oil, for instance, is sprayed in, finely distributed, via an oil line 33. A hydrogen line 34 additionally leads into the reaction vessel 32. Part of the hydrogen required is fed to the reaction vessel 32 at a temperature of about 1000° K. via this line. In part 35 of the reaction vessel, the hydrogen is mixed with the residue oil supplied causing some cracking, vaporization of the more volatile constituents of the oil and degradation of relatively non-volatile constituents which assume more the characteristics of carbonaceous solid particles. The mixture which is at a temperature of 700° K. or lower because the higher level heat of the hydrogen is consumed by heat of vaporization and endothermic heat of reaction then flows into heat exchanger tubes 36 which form the middle part of the reaction vessel 32. The heat exchanger tubes are arranged between two perforated plates 37 and 38. In the middle of the heat exchanger tubes 36, there is a partition 39 provided with an opening, for conducting the heating gas. A combustion chamber 40 serves to generate combustion gas for heating the heat exchanger tubes 36. The hot gases leaving the combustion chamber 40 are fed through a gas line 41 into the part of the reaction vessel 32 provided with heat exchanger tubes 36. Through the opening in the partition 39, they pass to an exhaust gas line 43 in the direction of the arrows 42. Contrary to conventional heat exchangers, the heat exchanger tubes 36 are therefore heated in concurrent or parallel flow, i.e., the coldest mixture of oil and hydrogen which leaves part 35 of the reaction vessel 32, comes first into contact with the ends of the heat exchanger tubes 36 which are heated most because the hot gas from line 41 first comes into contact with that end of the heat exchanger tubes 36. In this manner the initially intensive cooling of the mixture of oil and hydrogen will not let the surface temperature of the heat exchanger tubes 36 drop below 1000° K., so that adhesion or caking of oil particles with each other and with the heat exchanger tubes is avoided.

When the oil-hydrogen mixture has reached the perforated plate 38, the additional amount of hydrogen required for hydrogen gasification is fed through the hydrogen line 44 into part 45 of the reaction vessel 32. Because the heat exchanger tubes 36 protrude, uniform mixing of the hot oil-hydrogen mixture with the secondary hydrogen is possible. The reaction vessel 32 is followed by a cyclone 46 for separation of gases and hydrocarbon vapors from non-volatile residue containing coke and carbonaceous materials. These products are discharged from two outlets in cyclone 46, namely, an outlet 47 for the non-volatile residue, and an outlet 48 for the gases and the condensably hydrocarbons produced.

There are claimed:

1. A method of preventing adhesion or caking of normally liquid hydrocarbon-containing raw materials including residual oil which in the presence of hydrogen are partially gasified by hydrogenation gasification in a reaction vessel through which the raw material passes while being heated to a temperature above 700° K., which comprises passing raw materials in particle form downwardly through the reaction vessel, introducing a hydrogen-containing gas at a temperature above 700° K. in admixture with the raw materials to heat the raw materials to a temperature above 700° K. and to effect hydrogenation gasification of part of the raw materials, contacting the particles of raw materials as they pass downwardly through the reaction vessel in a temperature zone of about 600° to 700° K. with a medium which is at a temperature above 1000° K. to rapidly heat the surfaces of raw material particles to above 700° K. by direct contact with the hot medium alone, in the absence of combustion of raw materials with added oxygen to cause the raw material particles to become noncaking in its downward passage through the reaction vessel at a temperature above 700° K. wherein the medium for rapidly heating the surfaces of the raw material particles is heat exchanger tubes heated by a heating gas flowing in parallel flow and in indirect heat exchange with the raw material particles and wherein at least a portion of the hydrogen-containing gas is introduced in admixture with the raw materials prior to passing in contact with the heat exchanger tubes.

2. Method according to claim 1, wherein another portion of the hydrogen-containing gas is introduced in admixture with the raw materials after passing in contact with the heat exchange tubes.

* * * * *